United States Patent [19]

Baecchi et al.

[11] Patent Number: 4,775,048
[45] Date of Patent: Oct. 4, 1988

[54] DISPENSING UNIT FOR MANUALLY-OPERATED HOT DRINK DISPENSING MACHINE WITH PRE-MANUFACTURED THROWAWAY CAPSULES OF TWO SIZES

[76] Inventors: Alfredo Baecchi, Via Confalonieri 10, Firenze; Aldo Bozzolini, Via Lazzerini 29, Sesto Fiorentino; Tancredo Santoni, Via Donizzetti 74, Scandicci (Firenze); Carlo Mori, Via Grandi 30, Campi Bisenzio (Firenze), all of Italy

[21] Appl. No.: 867,382

[22] Filed: May 27, 1986

Related U.S. Application Data

[62] Division of Ser. No. 664,482, Oct. 24, 1984, Pat. No. 4,646,626.

[51] Int. Cl.$^4$ ............................................. B65D 81/00
[52] U.S. Cl. ...................................... 206/0.5; 99/306; 426/77; 426/82
[58] Field of Search ................ 99/295, 305, 306; 210/476, 479; 206/0.5; 220/74, 306, 368; 422/278; 426/77-80, 82, 84, 112, 432, 433, 435

[56] References Cited

U.S. PATENT DOCUMENTS

| | | | |
|---|---|---|---|
| 3,445,237 | 5/1969 | Gidge | 426/77 |
| 3,519,163 | 7/1970 | Bardell | 220/306 |
| 3,943,058 | 3/1976 | Wurm | 99/306 |
| 4,167,136 | 9/1979 | Chupurdy | 99/306 |
| 4,174,659 | 11/1979 | Pugliese et al. | 99/306 |
| 4,186,842 | 2/1980 | Albert | 220/306 |
| 4,206,694 | 6/1980 | Moskowitz et al. | 99/295 |
| 4,398,648 | 8/1983 | Cerny et al. | 220/74 |
| 4,453,647 | 6/1984 | Neat | 220/306 |
| 4,471,689 | 9/1984 | Piana | 426/77 |

FOREIGN PATENT DOCUMENTS 0978715  4/1951  France ............................. 210/476

Primary Examiner—Jimmy G. Foster
Attorney, Agent, or Firm—McAulay, Fields, Fisher, Goldstein & Nissen

[57] ABSTRACT

A container for beverages for use with a beverage dispensing apparatus. The container is also provided with a cover which controls the heat content of the liquid supplied to the container and contains a substance suitable to be dissolved in water. The container and cover are each provided with mating flanges, and the cover includes elements cooperating with the water supply. A dispensing unit is provided which includes a cylinder forming a sleeve for the containers during use, an inner cylinder forming two chambers suitable for forming a housing for the corresponding containers, and a water supply head equipped with several ports for hot water and a separate port for cold water. The cover of the containers is provided with two raised annular elements, suitable for forming a chamber communicating with the port for the cold water so that when a container, inserted into the cylinder is pressed against the head, only the introduction of hot water into the container is permitted and the heat content of the liquid supplied to the substance in the body is controlled.

4 Claims, 4 Drawing Sheets

FIG. 3
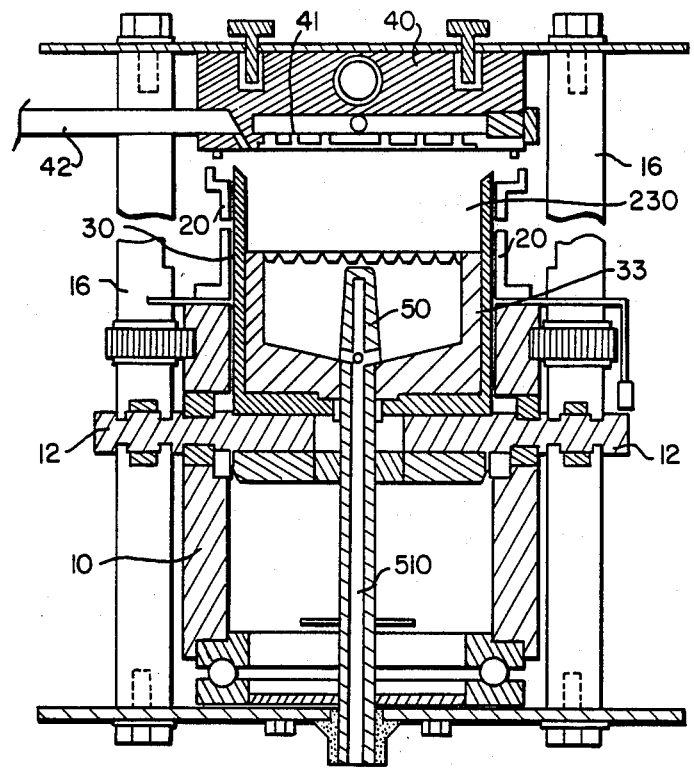
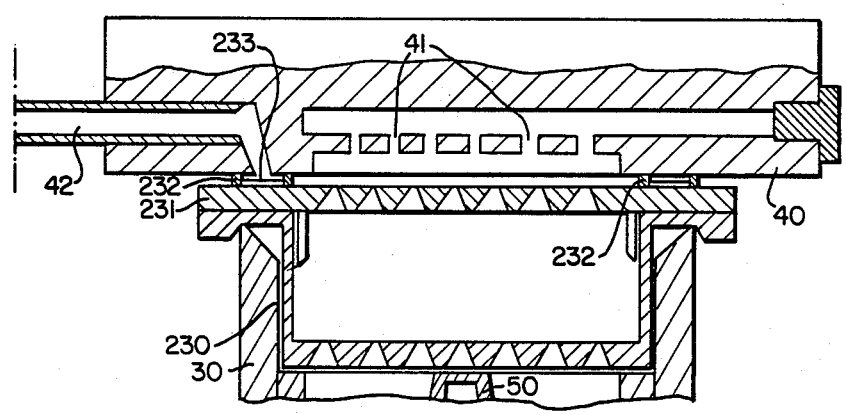
FIG. 4

FIG. 5
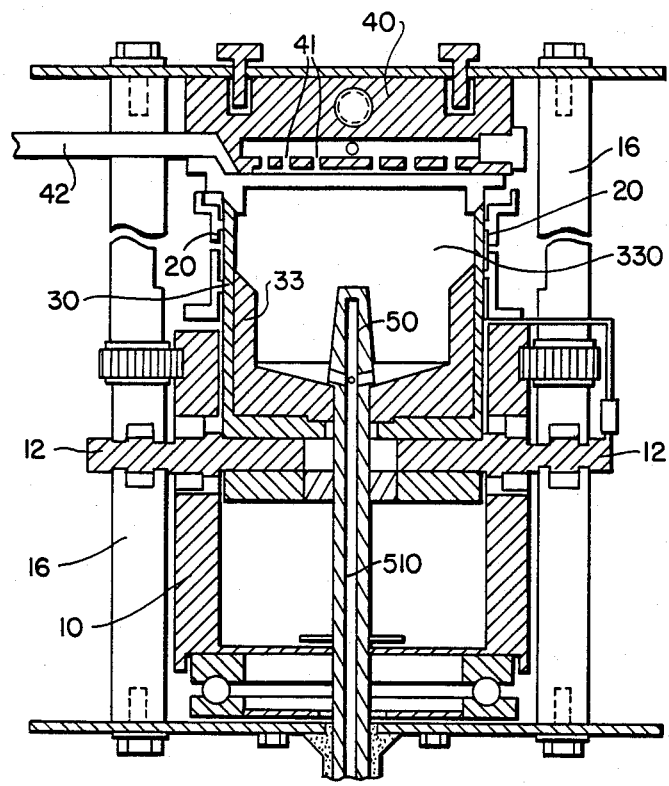
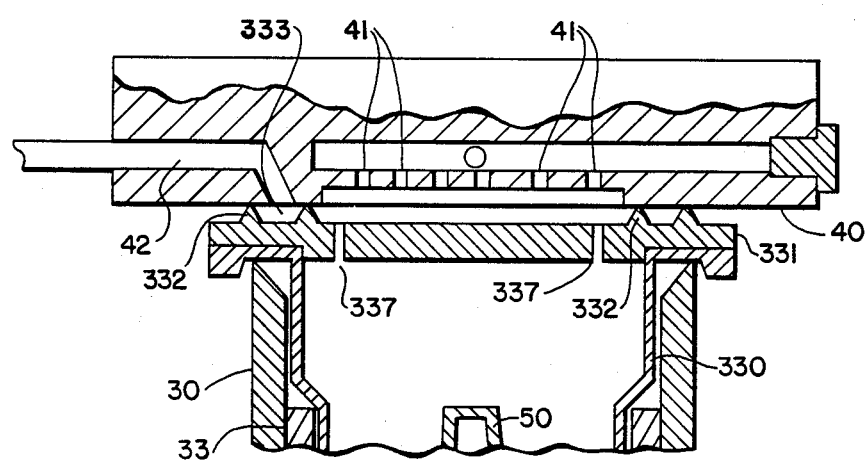
FIG. 6

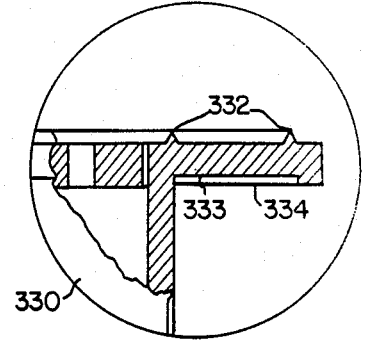
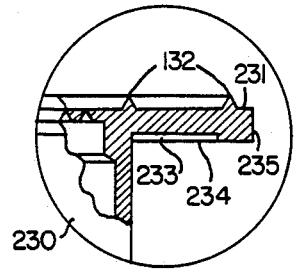
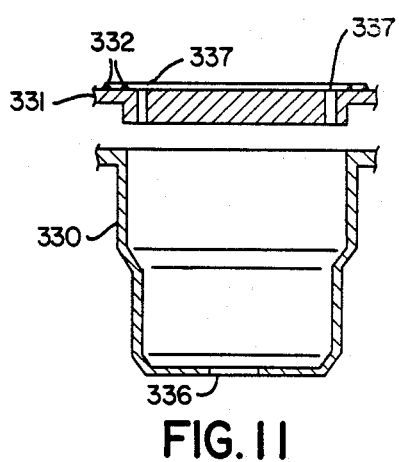
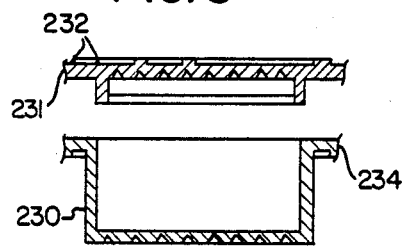
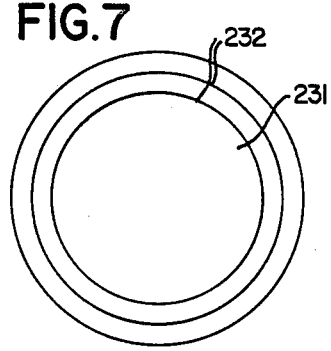
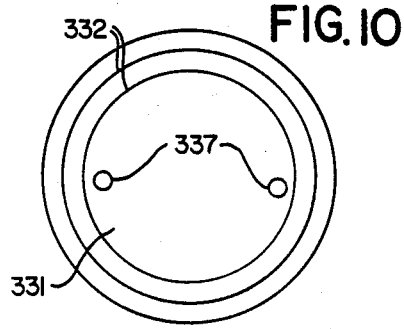

DISPENSING UNIT FOR MANUALLY-OPERATED HOT DRINK DISPENSING MACHINE WITH PRE-MANUFACTURED THROWAWAY CAPSULES OF TWO SIZES

This is a division of application Ser. No. 664,482 filed Oct. 24, 1984, U.S. Pat. No. 4,646,626.

FIELD OF THE INVENTION

The invention concerns a dispensing unit for a manually-operated hot drink dispensing machine with throwaway containers of two sizes.

There are known hot drink dispensing machines with pre-manufactured containers whose dispensing unit can use containers of one size only, so that, if it is designed to provide espresso coffee, which is a percolated drink from small-size containers, it is not capable of providing chocolate, cappuccino and similar suspension or solution drinks from large-size containers. This design for separate small and large-size containers therefore entails having to install at least two dispensing units in each dispensing machine.

There are also known hot drink dispensing machines with a dispensing unit suitable for both percolated and solution drinks. But, in that case, for those machines suitable for both percolated and solution drinks, the containers used, which must still be of the same overall dimensions, are of a large size also for espresso coffee, and this entails a higher cost in manufacturing the containers.

Furthermore, considering that the water to be introduce into the containers must be at a temperature of approx. 95° C. for espresso coffee and at approx. 70° C. for the other drinks, the presently known hot drink dispensing machines are equipped with a hot and cold water system. These hot drink dispensing machines are equipped either with two boilers for the water at two different temperatures or otherwise with a single boiler and at least one electric valve on the cold water pipe and some control circuits which must be operated by the user whenever requesting the dispensing of a drink other than espresso coffee.

OBJECTS AND SUMMARY OF THE INVENTION

An object of the present invention is to eliminate all these drawbacks by means of an automatic dispensing unit for a hot drink dispensing machine with pre-manufactured throwaway containers of both small and large size, that is, both for percolated espresso coffee and for solution or suspension of beverages.

According to the present invention there is provided a machine having a cylinder sleeve for a container with two compartments capable of forming the appropriate housing for the two container sizes, small and large. The machine includes a water outlet head with several ports for hot water and a separate port for cold water, and a combination of small and large containers, respectively. A cover is also provided which is equipped with two raised elements capable of intercepting, that is, closing completely or in part, respectively, the cold water port when the capsule is pressed by said sleeve cylinder against the head, so that, with a small-size container, the head can only supply hot water and, with a large-size container, both hot and cold water are supplied.

The advantages obtained from the present invention essentially consist in that with the same dispensing unit it is possible to use, as desired, small and large-size pre-manufactured containers.

Another advantage is that the hot and cold water system is considerably simplified in comparison with that currently used with hot drink dispensing machines.

A further advantage is that the supply of water at the appropriate temperature, depending on the desired type of drink, is automated and without any intervention on the part of the user.

Other advantages are that the containers used are easy to manufacture and not of appreciably higher cost in comparison with those presently known; and, that the containers used constitute a guarantee of the product contained in them and therefore favor consumer protection.

BRIEF DESCRIPTION OF THE DRAWINGS

The invention will now be described below in greater detail with the aid of drawings:

In the drawing:

FIG. 3 shows an axial vertical section of the unit in FIG. 1, containing a small-size container;

FIG. 4 shows an enlarged axial vertical section of the contact area between the container and the water supply head of the unit in FIG. 3;

FIG. 5 shows an axial vertical section of the unit in FIG. 1, containing a large-size container;

FIG. 6 shows an enlarged axial vertical section of the contact area between the container and the water supply head of the unit in FIG. 5;

FIG. 7 shows a plan view of a small-size container to be used in a dispensing unit according to the invention;

FIG. 8 shows an axial vertical section of a container of the invention;

FIG. 9 shows a vertical section of an enlarged detail of the cover of the container in FIG. 7;

FIG. 10 shows a plan view of a large-size container for a dispensing unit according to the invention;

FIG. 11 shows an axial vertical section of the containe in FIG. 10; and

FIG. 12 shows a vertical section of an enlarged detail of the cover of the container in FIG. 10.

DESCRIPTION OF BEST MODE

Considering its essential structure and with reference to FIGS. 1 through 6 of the attached drawings, a dispensing unit for a manually-operated hot drink dispensing machine with pre-manufactured throwaway containers of two sizes according to the invention is shown.

Figure 1:
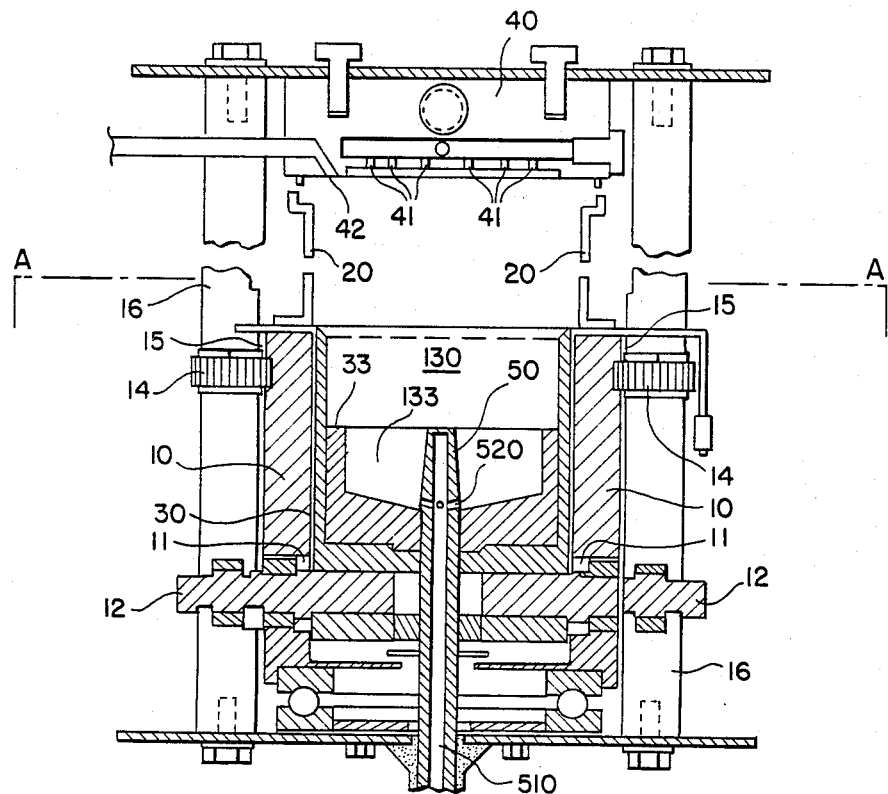
FIG. 1 shows an axial vertical view of a dispensing unit according to the invention, in the resting position.
Figure 2:
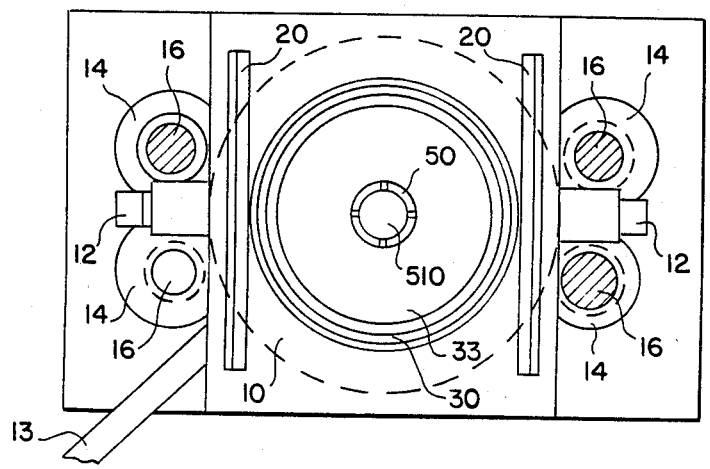
FIG. 2 shows a sectional view taken along line A—A of FIG. 1.

The dispensing unit comprises a tubular cam 10 with two diametrically opposite slots 11, see FIG. 1 for the passage of two horizontal brackets 12 and with a lever 13 shown in FIG. 2 to control the horizontal rotation, in either direction, of the cam 10. This cam 10 is held in its seat by the bushings 14 of a frame 16, engaging a horizontal groove 15 in the cam 10, while the brackets 12, guided between the uprights 16, are raised or lowered, respectively. Above the cam 10, there are two horizontal, parallel, fixed guides, to hold the manually-introduced container in a hanging position.

A hollow cylinder 30 is open at the top, and forms a sleeve for the container while in use, with an inner hollow inner cylinder 33, which is open at the top and shorter than cylinder 30. From the center of the funnel-shaped bottom of cylinder 33 there projects an integral element 50 in the shape of a truncated cone, with a flat head in the same plane as the mouth of the inner cyinder 33, to form a support for a small-size container or cup. The shaft of element 50 extends downwardly and has an axial hole 510 and several transverse holes 520, communicating with the axial hole 510. The lateral surface of the cylinder 30 is left uncovered by the inner cylinder 33, and forms a cylindrical chamber 130 suitable for housing a cylindrical container 230 of small size. The small size container 230 is one suitable for espresso coffee, whereas the lateral surface and the bottom of theinner cyinder 33 form a cylindrical chamber 133 which, together with the chamber 130 in cylinder 30, forms a bicylindrical chamber, suitable for housing a large-size bicylindrical container 233. The large-size container 233 is one of those pre-manufactured with freeze-dried or water-dilutable powdered substances and therefore is suitable for dissolved or suspended drinks.

The dispensing unit also includes a flat water supply head 40, with several ports 41 for hot water and a port 42, separate from the others 41, for cold water. Hot and cold water is to be supplied at the same pressure by a common pump.

With reference to FIGS. 7 through 9 of the attached drawings, a container 230 for percolated drinks has a cover 231 equipped with two annular, cuspidal, raised, concentric elements 232, positioned and sized to form an annular chamber 233. The chamber 233 communicates with port 42 in the head 40, whose watertight seal is obtained by the compression of the container against the head 40 in combination with the resistance exerted by the ground coffee bed contained in the container. Furthermore, the flange 234 in the body of the container is advantageously provided with a lower collar 235, suitable for adchoring the container to the sleeve cylinder 30, thereby preventing the container from reentering the cylinder 30 when the water under pressure flowing from the head 40 hits the container.

With reeference to FIGS. 10 through 12 in the attached drawings, a container 330 for beverages is composed of a body with two cyindrical sections oined by a collar in the sahpe of a truncated cone. The container haas a bottom with a central area 336, thinner and pre-grooved to facilitate the passage of element 50 in the inner cylinder 33, and a cover 331. The cover 331 is provided with two through holes 337, diametrically opposed and with two annular, cuspidal, raised, concentric elements 332, positioned so as to form an annular chamber 333. The annular chamber 333 communicates with port 42 in the head 40. The element 332 closer to the center of the cover is subject to bending in a centripetal direction as a result of the slight lowering of the body of the conttainer while being used and of its rapid empyting. The flange 334 in the body of container 330 is equipped with a lower collar 335 similar to collar 235 in container 230.

The operation of the unit is as follows:

After introducing a container 230-330 up to the center of the guides 20, the lever 13 is fully rotated, thereby covering the upper lateral surface of the container with the sleeve cylinder 30. Then the container is lifted until it touches the water supply head 40, and finally compressing the flange in the container, to obtain a watertight seal.

If the container is of small size 230, that is, for espresso coffee, the camber 232 is closed so that only hot water, flowing from the ports 41 in the head 40 passes through the container, and the espresso coffee flows from the pipe 510. Otherwise, if the container introduced is of large size 330, that is, for dissolved drinks, once it is lifted and pressed by the sleeve cylinder 30 against the head 40, the annular element 332 closer to the center of the cover 331 bends in a centripetal direction, so that the port 333 is open and the hot water flowing from the ports 41 is mixed with colder water flowing from the port 42 and, thus mixed, passes through the container, and the beverge flows from the pipe 510.

We claim:

1. A container for beverages for use with a beverage dispensing apparatus having a liquid supply head including at least one hot liquid supply port and a cold liquid supply port separate from said hot liquid supply port, each of the supply ports being adapted for supplying a liquid to the container, and wherein the container to receive the liquid cooperates with said dispensing apparatus and controls the heat content of the liquid supplied to the container, said container comprising;

a generally lower body including a base and a cylindraceous outer portion connected with said base to form a cupshaped member for holding such beverages, said body having an outer upper peripheral flange; and a cover for said body, said cover having an outer peripheral upper flange fitting over the outer upper peripheral flange of said body;

said cover including dispensing apparatus liquid sealing means on said cover for controlling the heat content of the liquid supplied to said body, and said sealing means cooperating with said liquid supply head when placed in compression thereagainst and forming a liquid tight seal with said head, said body being suitable to house a pre-manufactured substance suitable to be dissolved in the liquid;

said dispenser apparatus sealing means cooperating with said flanges on said body and said cover to control the heat content of the liquid supplied to the substance in said body; and said liquid sealing means on said cover including two annlar cuspidal raised concentric elements forming an annular chamber to communicate with the liquid supply head of the dispensing apparatus for closing off the cold liquid supply port to prevent the supply of cold liquid by compressing the liquid supply head against said annular, cuspidal raised, concentric elements.

2. The container of claim 1, wherein said container flange has an anchoring lower collar proximate to said container for suspending said container in said dispending unit apparatus.

3. A container for beverages for use with a beverage dispensing apparatus, said beverge dispensing apparatus including a water supply head with at least one hot water suppy port and a cold water supply port separate from said hot water supply port for supplying water to the container wherein the container to receive the water controls the heat content of the supplied water; said container comprising:

a generally lower body including a base and an upper portion forming a cup-shaped member for holding such beverages, said body having an outer peripheral flange;

a cover for said body, said cover having an outer peripheral upper flange fitting over said outer peripheral flange of said body;

said cover including two raised, annular, cuspidal sealing elements adapted to cooperte with said water supply head when placed in compression thereagainst and to form a water tight seal with said head, said two cuspidal annular elements forming an annular chamber, said body being suitable to house a pre-manufactured substance suitable to be dissolved in water; and said cuspidal sealing elements and said flanges on said body and said cover cooperating with each other to control the heat content of the liquid supplied to the substance in said body.

4. The container of claim 3, wherein:

said lower body comprises two cylindrical sections, one of said cylindrical sections being of a greater diametrical extent than the other, and a collar in the shape of a truncated cone joining said two cylindrical sections; and said two annular, cuspidal, raised, concentric elements on said cover forming an annular chamber to communicate with the cold water port in said water supply head, one of said two elements being subjected to bending in a centripetal direction.

* * * * *